United States Patent

Borne et al.

Patent Number: 6,069,336

Date of Patent: May 30, 2000

[54] PLASMA OR TIG WELDING OR CUTTING PROCESS WITH A NON-OXIDIZING GAS HAVING A LOW $H_2O$ AND/OR $O_2$ IMPURITY CONTENT

[75] Inventors: André Borne, Bessancourt; Francis Remy, Franconville, both of France

[73] Assignee: L'Air Liquide, Societe Anonyme Pour l'Etude et l'Exploitation des Procedes Georges Claude, Paris Cedex, France

[21] Appl. No.: 09/268,706

[22] Filed: Mar. 16, 1999

[30] Foreign Application Priority Data

Mar. 26, 1998 [FR] France ................................. 98 03743

[51] Int. Cl.[7] .............................. B23K 9/16; B23K 9/00; C06D 15/00
[52] U.S. Cl. ........................ 219/75; 219/121.52; 252/372
[58] Field of Search .......................... 219/75, 74, 121.52; 228/219; 252/372

[56] References Cited

U.S. PATENT DOCUMENTS

| | | | |
|---|---|---|---|
| 4,558,201 | 12/1985 | Hatch | 219/75 |
| 4,977,305 | 12/1990 | Severance | 219/121.52 |
| 5,210,388 | 5/1993 | Farwer | 219/74 |
| 5,210,389 | 5/1993 | Farwer | 219/74 |
| 5,396,039 | 3/1995 | Chevrel et al. | 219/74 |
| 5,539,171 | 7/1996 | Ohmi et al. | 219/74 |
| 5,558,791 | 9/1996 | Farwer | 219/75 |
| 5,667,133 | 9/1997 | Ohmi et al. | 228/219 |

FOREIGN PATENT DOCUMENTS

| | | |
|---|---|---|
| 2 251 153 | 6/1975 | France . |
| 03099772 | 4/1991 | Japan . |
| 06039554 | 2/1994 | Japan . |

*Primary Examiner*—Patrick Ryan
*Assistant Examiner*—Anjan Dey
*Attorney, Agent, or Firm*—Young & Thompson

[57] ABSTRACT

The invention relates, on the one hand, to an electric-arc work process, such as a plasma cutting or TIG welding process, in which a torch is supplied with at least one non-oxidizing gas, the said torch being provided with at least one electrode made of pure or alloyed metal, such as a tungsten electrode, characterized in that the said non-oxidizing gas contains a concentration of impurities of the oxygen type $[O_2]$ of less than 80 ppmv and a concentration of impurities of the water vapor type $[H_2O]$ of less than 400 ppmv and, on the other hand, to such a welding gas.

13 Claims, 4 Drawing Sheets

PLASMA OR TIG WELDING OR CUTTING PROCESS WITH A NON-OXIDIZING GAS HAVING A LOW H₂O AND/OR O₂ IMPURITY CONTENT

FIELD OF THE INVENTION

The present invention relates to an electric-arc work process, such as a plasma or TIG welding process, in which a non-oxidizing gas containing a low but non-zero concentration of impurities, particularly of impurities of the oxygen ($O_2$) and/or water vapour ($H_2O$) type, is used.

In the context of the present invention, the expression "electric-arc work process" should be understood to mean not only an arc welding process but also a cutting, marking, surfacing or spraying process, such as plasma-arc or TIG processes.

BACKGROUND OF THE INVENTION

A torch for electric-arc work, such as a plasma cutting torch, usually comprises an electrode, made completely or partly of an emissive material, which electrode has a generally cylindrical or frusto-cylindrical shape, a nozzle placed coaxially with respect to the electrode and forming a diaphragm in the path of the plasma arc, a circuit for internally cooling the torch, especially the electrode, and one or more circuits for delivering a plasma gas into a chamber bounded, on the one hand, by the electrode and its support and, on the other hand, by the internal part of the nozzle and of its support.

In operation, the electrode is connected to one of the poles of a power supply while the nozzle is connected to the other pole of the power supply.

After part of a plasma gas stream, flowing between the lower end of the electrode and a gas ejection channel made in the nozzle, has been ionized, a first electric arc is generated, thus forming an arc plasma column starting at the base of or near the electrode and being drawn through the channel of the nozzle to the outside and as far as the material to be cut or welded, for example.

Depending on the type of use of the torch, the gas jet is brought up to a suitable power and maintained between the electrode, forming the cathode for example, and the nozzle, therefore forming the anode, throughout the welding or cutting operation for example, or, depending on the situation, before increasing the power, the gas jet is transferred to the workpiece, by closing up and electrical switching, the workpiece then forming the anode and the nozzle possibly being electrically disconnected.

Such torches and such processes are described for example in documents EP-A-599,709, EP-A-573,330, U.S. Pat. No. 5,597,497, WO-A-96/23620, U.S. Pat. No. 5,451,739, EP-A-0,787,556, FR-A-2,669,847 and FR-A-2,113,144.

In some cases, especially for technical or constructional reasons, the plasma gas in the chamber bounded by the electrode and the nozzle is delivered in an injection plane approximately perpendicular to the axis of the electrode. Thus, the gas may be injected into the chamber as a ring centered on the axis of the electrode, via a continuous and circular slit.

In another situation, the gas may be injected into the chamber via a piece having the shape of a ring within which calibrated holes are made, the axes of the holes converging on and intersecting the axis of the electrode.

Likewise, a TIG welding torch comprises a generally pointed or sharpened tungsten electrode, the electric welding arc being established between the electrode and the workpiece to be welded.

However, a problem arises that has not been satisfactorily solved hitherto, namely the problem of rapid wear or deterioration of the electrode during use of the plasma torch or the TIG torch in a welding, cutting or similar process.

In fact, the lifetime of an electrode, particularly a pure or alloyed tungsten electrode, depends on many parameters, such as the power of the electric arc, the nature and flow rate of the gas and the operating cycle of the torch.

Now, rapid electrode wear is very costly from an industrial standpoint given that it entails more frequent maintenance operations in order to replace the worn pieces or to resharpen the electrode in the case of a TIG torch, this only being possible after dismantling the torch and therefore involving frequent and inopportune production stoppages. This therefore also increases the overall cost of the welding process.

Furthermore, electrode wear causes, moreover, an appreciable reduction in the performance of the torch, leading to a degradation in the quality of the work produced, for example a reduction in the quality of the cut obtained.

Document FR-A-2,251,153 emphasizes the problem of tungsten electrode oxidation and recommends, in order to try to solve the problem, adding from 0.1 to 1% of hydrogen to argon or helium in order to obtain a plasma gas mixture.

Moreover, document JP-A-06,039,554 describes a shielding gas, for welding galvanized steel, which contains up to 7% oxygen and also carbon dioxide.

SUMMARY OF THE INVENTION

The object of the present invention is therefore to solve the aforementioned problems by proposing a process making it especially possible to increase the lifetime of the electrode appreciably, particularly the electrode of a plasma cutting torch or a TIG welding torch.

The present invention therefore relates to an electric-arc work process, in which a torch is supplied with at least one non-oxidizing gas, the torch being provided with at least one electrode made of pure or alloyed metal, characterized in that the at least one non-oxidizing plasma gas contains a concentration of impurities of the oxygen type $[O_2]$ of less than 80 ppmv and a concentration of impurities of the water vapour type $[H_2O]$ of less than 400 ppmv (parts per million by volume) and in that the ratio of the oxygen concentration $[O_2]$ to the water vapour concentration $[H_2O]$ in the gas is such that:

$$0 \leq [O_2]/[H_2O] \leq 1/3.$$

The inventors of the present invention have in fact demonstrated that the purity of the gas has an appreciable effect on the lifetime of the electrode, particularly in the case of a pure or alloyed tungsten electrode.

Thus, industrial gases, such as nitrogen or argon, normally used as gases for welding, cutting or similar processes, contain impurities, especially of the oxygen and/or water vapour type, impurities which accelerate the deterioration of the electrode.

Thus, judiciously controlling, adjusting or choosing the impurity content of the gas used results in improved performance, especially less rapid wear of the electrode, greater arc stability, less oxidation of the weld bead or of the edges of the cut, etc.

According to the invention, the impurity content of the gas used is preferably measured inside the torch body, advantageously near the electrode.

Preferably, the process according to the invention comprises one or more of the following characteristics:

- the gas used contains less than 50 ppmv of oxygen, preferably less than 25 ppmv of oxygen, more preferably less than 15 ppmv of oxygen and advantageously less than 10 ppmv of oxygen;
- the gas used contains less than 200 ppmv of water vapour, preferably less than 100 ppmv of water vapour, more preferably less than 50 ppmv of water vapour and advantageously less than 25 ppmv of water vapour;
- the gas used contains more than 1 ppbv (parts per billion by volume) of oxygen, more than 10 ppbv of oxygen, more than 100 ppbv of oxygen, more than 1 ppmv of oxygen, more than 3 ppmv of oxygen or more than 5 ppmv of oxygen;
- the gas used contains more than 1 ppbv of water vapour, more than 10 ppbv of water vapour, more than 100 ppbv of water vapour, more than 1 ppmv of water vapour, more than 5 ppmv of water vapour or more than 10 ppmv of water vapour;
- the sum of the concentrations of $O_2$ and $H_2O$ impurities in the gas is such that: $[O_2]+[H_2O] \leq 450$ ppmv, preferably $[O_2]+[H_2O] \leq 200$ ppmv, more preferably $[O_2]+[H_2O] \leq 80$ ppmv, preferably $[O_2]+[H_2O] \leq 45$ ppmv and advantageously $[O_2]+[H_2O] \leq 30$ ppmv;
- the ratio of the oxygen concentration to the water vapour concentration in the gas is such that:

$$0 < [O_2]/[H_2O] \leq 1/3;$$

- a torch provided with an electrode made of tungsten, molybdenum, copper or alloys thereof, i.e. an alloy containing one or more of these metals, preferably tungsten, is used;
- the non-oxidizing gas is chosen from argon, nitrogen, helium, hydrogen or mixtures thereof;
- the process is chosen from plasma cutting, plasma spraying, plasma welding, plasma marking, plasma surfacing or plasma-arc heat treatment processes;
- the process is chosen from TIG (Tungsten Inert Gas) welding processes.

The invention also relates to the use of the above-mentioned process in an operation of plasma cutting a metal or metal-alloy structure, especially a steel, aluminum or stainless steel structure.

According to another aspect, the invention also relates to a plasma gas which can be used in a process according to the invention, particularly a plasma cutting or TIG welding process, characterized in that it contains a concentration of impurities of the oxygen type of less than 80 ppmv and a concentration of impurities of the water vapour type of less than 400 ppmv and in that the ratio of the oxygen concentration $[O_2]$ to the water vapour concentration $[H_2O]$ in the gas is such that:

$$0 \leq [O_2]/[H_2O] \leq 1/3,$$

preferably a concentration of oxygen impurities of less than 15 ppmv and a concentration of water vapour impurities of less than 50 ppmv.

BRIEF DESCRIPTION OF THE DRAWINGS

The invention will now be explained in detail with the aid of examples and of the appended figures which are given by way of illustration but are not limiting.

DETAILED DESCRIPTION OF THE INVENTION

EXAMPLES

The purpose of the tests carried out in the examples below is to show the influence of $O_2$ and $H_2O$ impurities on the wear of the electrode of a plasma torch using a non-oxidizing gas containing the impurities.

In all these cases, the non-oxidizing gas used is either nitrogen or an argon/hydrogen mixture and the electrode used is made of tungsten.

Example 1

Influence of $H_2O$ Impurities using a Gas of the Nitrogen Type

Nitrogen artificially contaminated with variable amounts of water vapour ($H_2O$) is used as non-oxidizing gas for supplying a plasma cutting torch.

The depth (in mm) of the wear pit or crater appearing in the tungsten electrode as a function of the number of striking cycles to which the torch is subjected is determined, this being done for various $H_2O$ impurity contents in the gas used.

The total duration of a striking cycle corresponds to the duration of the actual striking of the electric arc, to which a cutting time of approximately 15 seconds is added.

In this Example 1, the $O_2$ impurity content is regarded as negligible (<2 ppmv).

Furthermore, the tests with the various $H_2O$ impurity contents of the gas are stopped when the depth of the crater reaches approximately 0.28 mm, this being regarded as the maximum acceptable depth beyond which it becomes necessary to replace the electrode.

Figure 1:
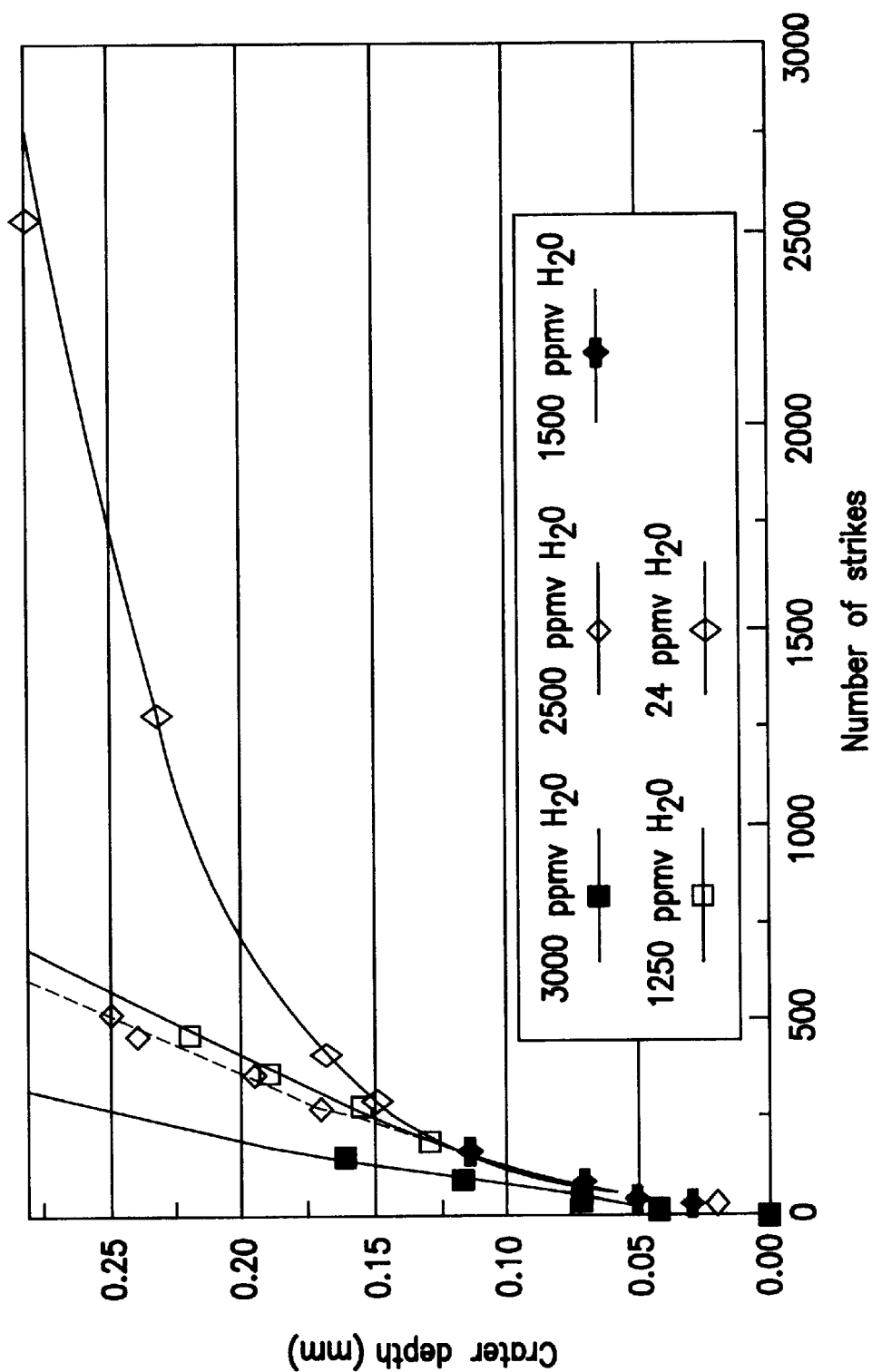
FIG. 1 is a graph representing the relationship of the wear rate of a tungsten electrode as a function of the concentration of water vapor impurity.

The results obtained are illustrated in FIG. 1, which clearly shows that the lower the $H_2O$ impurity concentration, the lower is the wear rate of the electrode.

Thus, for an $H_2O$ impurity content of the nitrogen of 3000 ppmv (parts per million by volume), the 0.28 mm depth is reached after only approximately 250 strikes, whereas for an $H_2O$ impurity content of 24 ppmv the 0.28 mm depth is reached only after 2500 strikes, that is to say the lifetime of the electrode is multiplied by a factor of 10.

Figure 2:
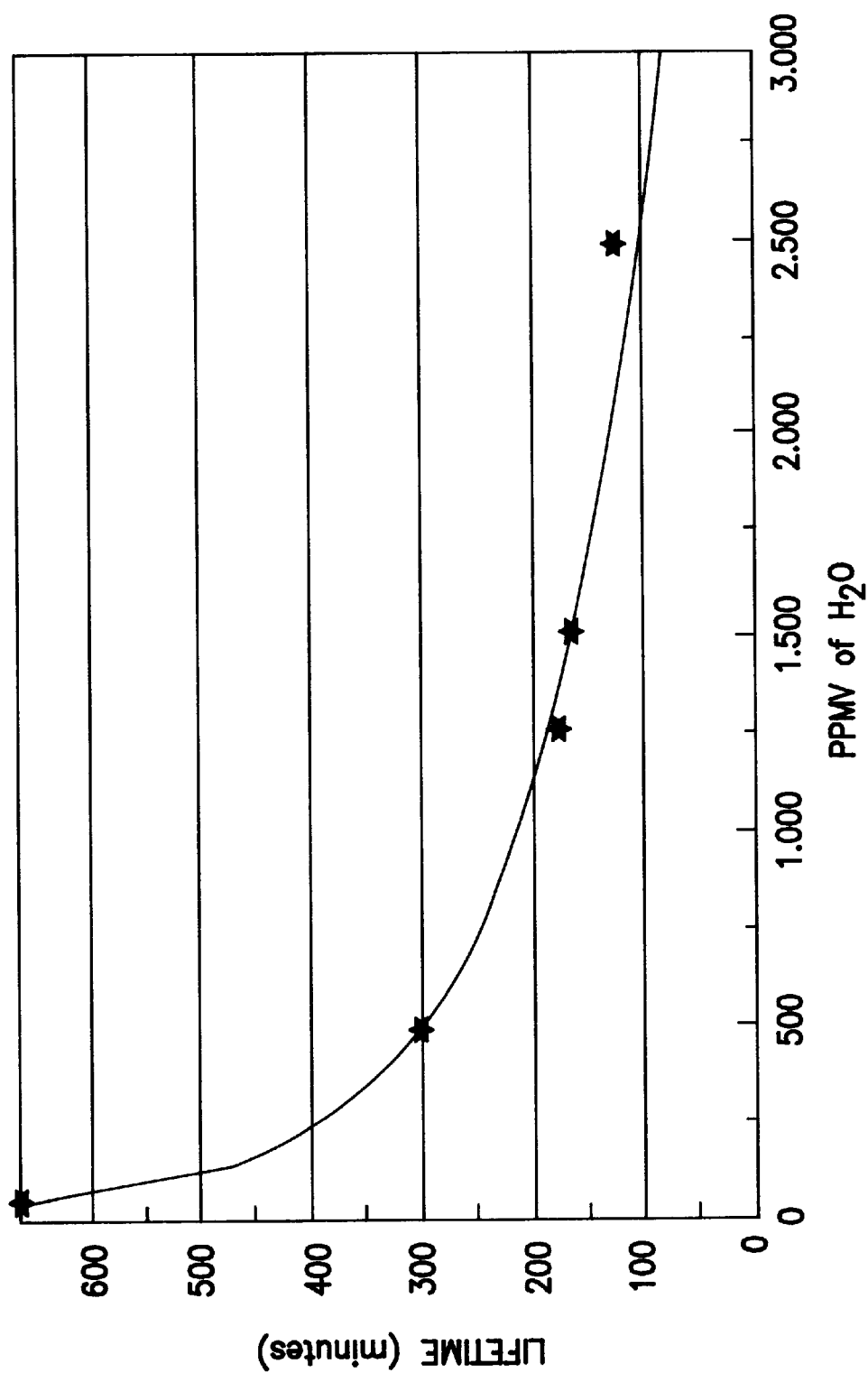
FIG. 2 is a graph representing the lifetime of the tungsten electrode as a function of the water vapor impurity content.

The results in FIG. 1 have allowed us to establish the curve of the lifetime (in minutes) of the tungsten electrode as a function of the $H_2O$ impurity content (in ppmv) of the nitrogen used as plasma gas, this curve being shown diagrammatically in FIG. 2.

In light of FIG. 2, it is apparent that, in order to be able to guarantee an electrode lifetime of at least 5 hours during a plasma arc cutting operation, it is necessary to use a non-oxidizing gas (nitrogen) containing less than approximately 450 ppmv, preferably less than approximately 400 ppmv, of $H_2O$ impurities.

Example 2

Influence of $O_2$ Impurities using a Non-oxidizing Gas of the Nitrogen Type

This Example 2 is similar to Example 1, except for the fact that the nitrogen used as non-oxidizing gas is contaminated, this time, with variable amounts of $O_2$-type impurities, the $H_2O$ impurity content now being regarded as negligible (<2 ppmv $H_2O$).

Figure 3:
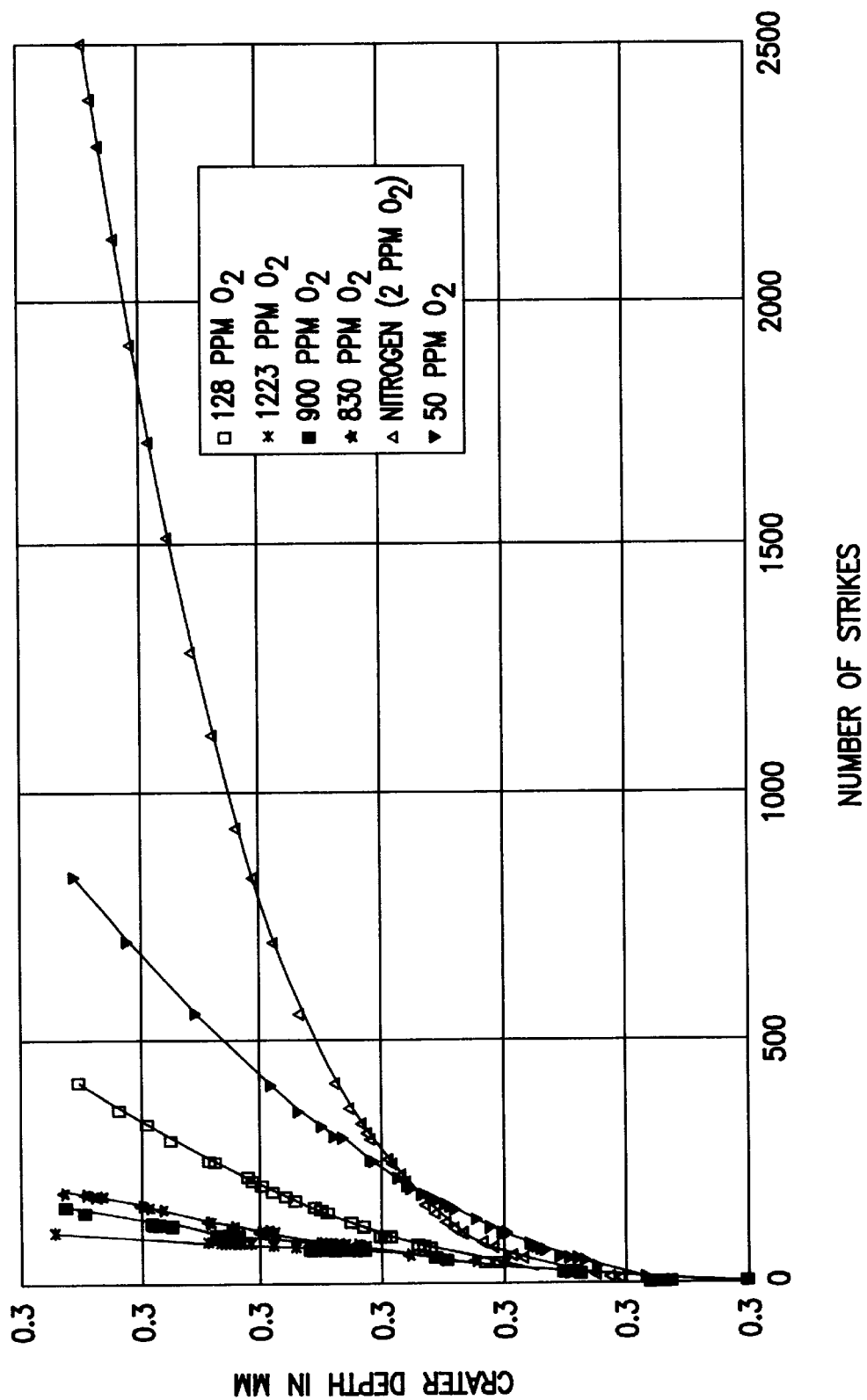
FIG. 3 is a graph representing the relationship of the wear rate of a tungsten electrode as a function of the concentration of oxygen impurities.
Figure 4:
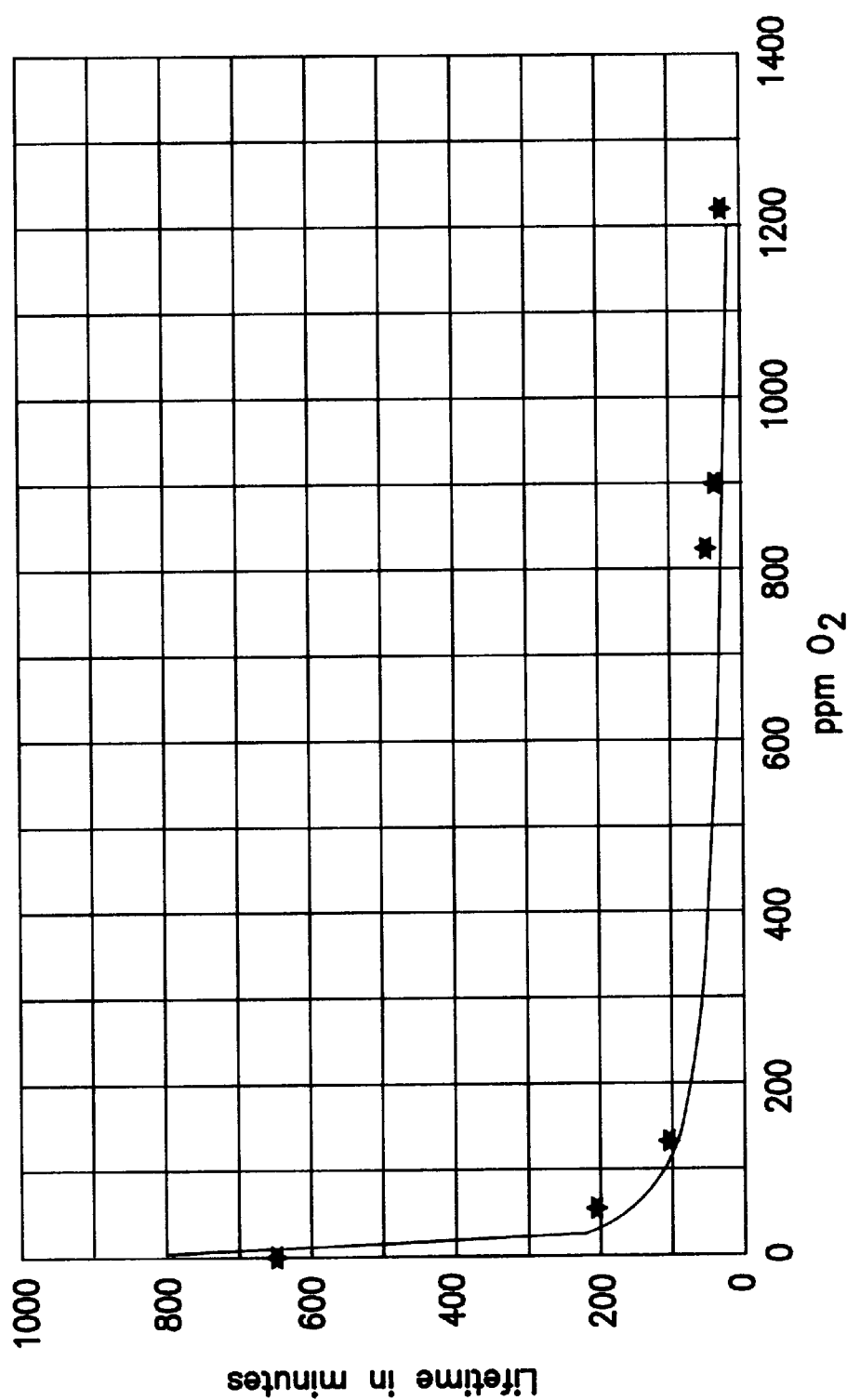
FIG. 4 is a graph representing the lifetime of the tungsten electrode as a function of the oxygen impurity content.

The results obtained have been plotted in FIGS. 3 and 4, which are similar to FIGS. 1 and 2 respectively.

More specifically, FIG. 3 shows that the greater the $O_2$ impurity content of the gas, the more rapid is the wear of the tungsten electrode.

Furthermore, FIG. 4 clearly demonstrates that, in order to obtain an electrode lifetime of at least 5 hours during a plasma arc cutting operation, it is necessary to ensure that a non-oxidizing gas containing less than 50 ppmv of $O_2$, and advantageously less than approximately 15 ppmv of $O_2$ impurities, is used.

Example 3

Influence of $O_2$ and/or $H_2O$ Impurities using a Non-oxidizing Gas of the $Ar/H_2$ Type This Example 3 is similar to Examples 1 and 2, except for the gas used, which is an argon/hydrogen mixture ($Ar/H_2$) comprising approximately 75% Ar and 25% $H_2$.

The lifetime (in hours) of the tungsten electrode in the presence of the $Ar/H_2$ mixture and as a function of the $O_2$ and/or $H_2O$ impurity content of the gas mixture was evaluated.

In this case, in order to evaluate the electrode wear, the value of the arc voltage over time is determined, the electrode being regarded as having deteriorated when there is a drop in arc voltage of at least 5 V.

Before each time the plasma torch is started or an arc is struck, the lines are purged with nitrogen containing less than 5 ppm of $H_2O$ and $O_2$ impurities so as to remove therefrom any impurities that they contain.

The tests are carried out for gas ($Ar/H_2$) flow rates of 10 l/min. and 35 l/min.

The ignition/extinction cycle of the plasma torch, with a total duration of approximately 6 minutes, is repeated approximately 24 times.

The results of the tests are given in the table below.

TABLE

| TEST No. | $H_2O$ CONTENT (ppmv) | $O_2$ CONTENT (ppmv) | ELECTRODE LIFETIME (HOURS) |
|---|---|---|---|
| A | 20 | 8 | 11 |
| B | 1000 | 8 | 4 |
| C | 40 | 8 | 19 |
| D | 40 | 110 | 13 |
| E | 850 | 150 | 4 |

Tests A to E confirm the observations made with regard to Examples 1 and 2, namely the higher the content of $H_2O$ and $O_2$ impurities in the gas, the more rapid is the deterioration of the electrode.

Thus, in light of Tests A and B, it is observed that, in the case of 1000 ppmv of $H_2O$ impurities in the $Ar/H_2$ mixture, there is a 60% drop in the electrode lifetime compared with an $Ar/H_2$ mixture containing only 20 ppmv of $H_2O$, the $O_2$ content remaining constant.

Likewise, in light of Tests C and D, it may be seen that a 100 ppmv increase in $O_2$ impurities results in a drop in the electrode lifetime of approximately 30%, the $H_2O$ content not varying.

Furthermore, Test E shows that the simultaneous presence of $O_2$ and $H_2O$ impurities in high concentrations results in an 80% reduction in the electrode lifetime (compared with Test C).

Moreover, after examining the other pieces of which the plasma torch is composed, it is apparent that the presence of large quantities of $O_2$ and $H_2O$ impurities (Test E, for example) in the gas stream causes premature wear, especially of the plasma-ejection and electric-arc nozzle.

However, it should be noted that the differences in performance observed between Test A and Test D may be explained by the use of different plasma torches.

The above Examples 1 to 3 clearly illustrate that strict control of the content of $O_2$ and $H_2O$ type impurities in the non-oxidizing gas allows the lifetime of an electrode of a plasma torch using this non-oxidizing plasma gas to be appreciably improved.

Although the above tests were carried out by means of a plasma torch used in the context of a plasma cutting operation, the results obtained are quite transposable to TIG welding processes, in which the use of a non-oxidizing gas having a low content of $H_2O$ and/or $O_2$ impurities allows the lifetime of the pointed tungsten electrode to be improved.

This is because a high content of $O_2$ and $H_2O$ impurities leads to a rapid wear of the tip of the tungsten electrode and therefore significantly destabilizes the arc and reduces the quality of the weld produced, resulting particularly in the welded joint being brittle and/or oxidized and/or being sensitive to corrosion.

As a result therefore, it is usual to replace or resharpen the tungsten electrode more often, so as to guarantee suitable TIG welding.

The process according to the invention therefore makes it possible to alleviate these problems by a minimum incorporation of oxidizing agents into the welded joint.

We claim:

1. In an electric-arc work process, which comprises: supplying a torch with at least one non-oxidizing gas, said torch being provided with at least one electrode made of pure or alloyed metal, the improvement wherein said at least one non-oxidizing gas contains a concentration of oxygen impurities of less than 80 ppmv and of more than 10 ppbv, and a concentration of water vapor impurities of less than 400 ppmv and of more than 100 ppbv; and wherein the ratio of the oxygen concentration to the water vapor concentration in the gas is such that:

$$0 \leq [O_2]/[H_2O] \leq \frac{1}{3}.$$

2. Process according to claim 1, wherein the gas contains less than 50 ppmv of oxygen and less than 200 ppmv of water vapor.

3. Process according to claim 2, wherein the gas contains less than 15 ppmv of oxygen and less than 50 ppmv of water vapor.

4. Process according to claim 1, wherein the sum of the concentrations of oxygen impurities $[O_2]$ and water vapor impurities $[H_2O]$ in the gas is such that:

$$[O_2]+[H_2O] \leq 450 \text{ ppmv}.$$

5. Process according to claim 1, wherein the sum of the concentrations of oxygen impurities $[O_2]$ and water vapor impurities $[H_2O]$ in the gas is such that:

$$[O_2]+[H_2O] \leq 200 \text{ ppmv}.$$

6. Process according to claim 1, wherein the electrode is made of pure or alloyed metal selected from the group consisting of tungsten, molybdenum, copper or mixtures thereof.

7. Process according to claim 1, wherein the non-oxidizing gas is selected from the group consisting of argon, nitrogen, helium, hydrogen or mixtures thereof.

8. Process according to claim 1, wherein the process is chosen from plasma cutting, plasma welding, plasma marking, plasma surfacing, plasma spraying or plasma-arc heat treatment processes.

9. Process according to claim 1, wherein the process is a TIG welding process.

10. Process according to claim 1, used in an operation of cutting a metal or metal-alloy structure.

11. Process according to claim 1, used in an operation of cutting a steel, stainless steel, or aluminum structure.

12. Non-oxidizing gas comprising at least one component selected from the group consisting of argon, nitrogen, helium, hydrogen or mixtures thereof, and containing a concentration of oxygen impurities of less than 80 ppmv and of more than 10 ppbv, and a concentration of water vapor impurities of less than 400 ppmv and of more than 100 ppbv, and wherein the ratio of the oxygen concentration [$O_2$] to the water vapor concentration [$H_2O$] in the gas is such that:

$$0 \leq [O_2]/[H_2O] \leq 1/3.$$

13. Non-oxidizing gas according to claim 12, wherein the concentration of oxygen impurities is less than 15 ppmv and the concentration of water vapor impurities is less than 50 ppmv.

* * * * *